July 28, 1942.  J. H. KENNEDY  2,291,044
SEPARATION OR RECOVERY OF VALUES FROM AGGREGATE MATERIALS
Filed Feb. 21, 1940  2 Sheets-Sheet 1
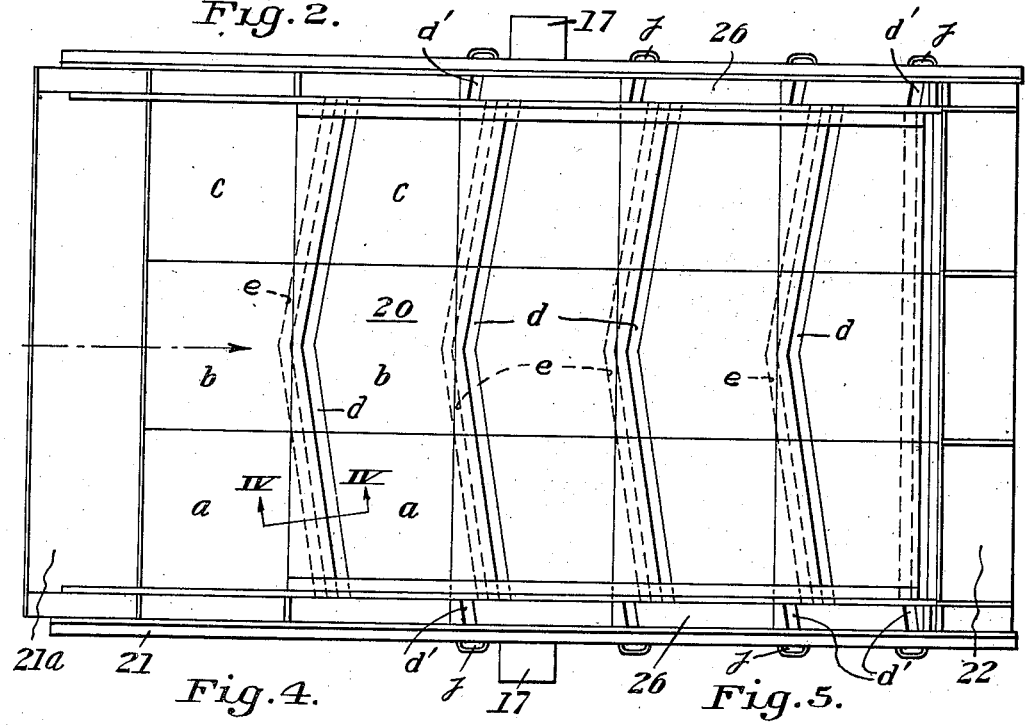
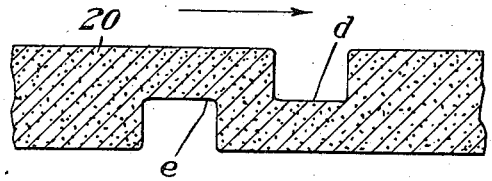
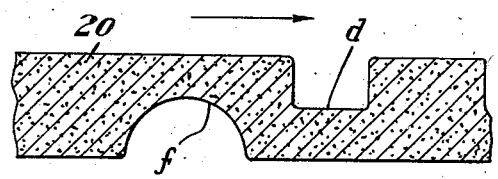
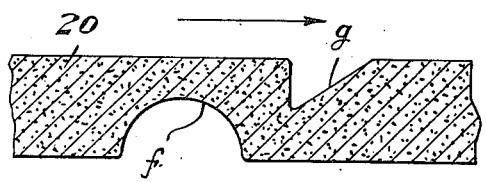
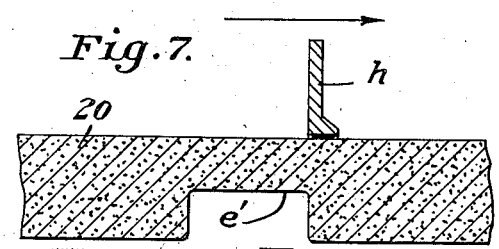
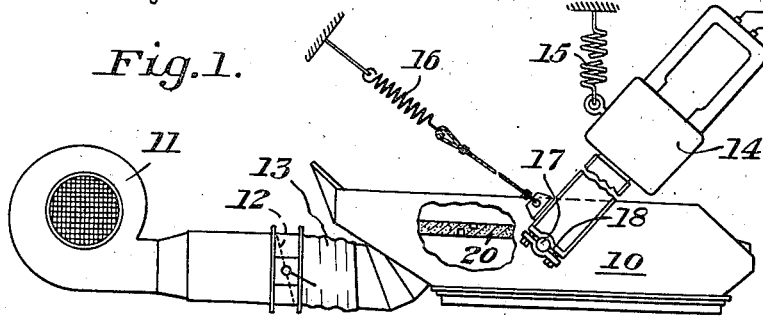

July 28, 1942.  J. H. KENNEDY  2,291,044
SEPARATION OR RECOVERY OF VALUES FROM AGGREGATE MATERIALS
Filed Feb. 21, 1940  2 Sheets-Sheet 2

INVENTOR
James H. Kennedy
By
C. P. Byrnes
His attorney

Patented July 28, 1942

2,291,044

UNITED STATES PATENT OFFICE 2,291,044

SEPARATION OR RECOVERY OF VALUES FROM AGGREGATE MATERIALS

James H. Kennedy, Lansdowne, Pa., assignor to Morgan Concentrating Corporation, Philadelphia, Pa., a corporation of Delaware Application February 21, 1940, Serial No. 320,109

19 Claims. (Cl. 209—467)

This invention pertains to the separation or recovery of values from aggregate materials such as found, for example, in placer locations.

In one aspect, my invention deals particularly with apparatus and procedure for effecting an improved separation or recovery of values. I employ a porous or pervious bed that is preferably vibrated in a straight line by an electrical vibrator; a gaseous fluid such as air is supplied to undersurface portions of the bed for effecting separation. The porous bed is also preferably provided with transversely-extending riffles or grooves for collecting the values regardless of their size, and for directing or advancing them forwardly.

The values are collected upon a basis of their specific gravity; they are fed from the flutes or riffles associated with main portions of the porous or foraminous bed towards side portions thereof and into side channels that are also preferably provided with porous or pervious bed portions. These side bed portions or channels are located at a level below the level of the main bed portion of the apparatus and may be provided with suitable riffles or flutes that, in turn, further aid in collecting values and concentrating them.

In employing a concentrating table of the above type, where the aggregate of the material passes over the surface of the bed, there is a constant stratification or separation by reason of the different specific gravity of the various parts of the aggregate.

It is apparent that a high through-put is necessary in operating apparatus of this type, if the operation is to be practical from a commercial standpoint. I have discovered a number of factors which have heretofore limited the through-put. In the first place, the aggregate may be slightly damp or wet or may contain fine magnetic iron, and as a result, there is a tendency for the materials to mass or back up during the operation. It can be understood that when one contemplates a through-put of, for example, 100 cubic yards or 150 tons of aggregate per hour, on a table about 3 feet in width and 5 feet long, that the material must move forward very rapidly. I have been able to increase normal through-put about 20 to 30 percent by employing a discovery which I have made, namely, that separating action can be very greatly augmented by increasing the quantity of air supplied to the porous table immediately behind or adjacent to a flute or riffle that is provided to catch the value content.

I have also discovered that the flutes should preferably have a small angle of forward inclination with respect to a transverse axis of the table and that the arrangement should be such that there will be a continuous and free flow of the collected value content without backing up at any point therealong. This, of course, is necessary not only to increase the through-put, but also to provide continuous operation, particularly where wet or moist materials are being separated.

For the purpose of illustrating my invention, I have shown suitable apparatus arrangements for carrying it out: Figure 1 is a somewhat diagrammatical side view in elevation of a complete unit constructed and arranged to embody certain novel features of the invention;

Figure 2 is an enlarged top plan view of a concentrating table constructed in accordance with my invention;

Figure 4 is a side sectional view in elevation taken along the line IV—IV of Figures 2 and 3;

Figures 5, 6 and 7 are similar elevations showing modified forms of riffle or flute arrangements;

Figure 11:
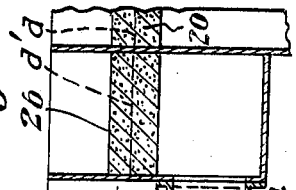
Figure 11 is a sectional view in vertical elevation taken along the line XI—XI of Figure 8.

Referring particularly to Figure 1, I have shown a blower 11 connected through a valve 12 and a flexible coupling 13 to a concentrating table 10. The table 10 is provided with a suitable porous bed construction 20 and trunnions extend transversely from its opposite sides at substantially the center of gravity thereof. An electric, straight-line-type of vibrator 14, controlled by rheostat 14a, is provided with adjustable connections 18 for mounting and securing it upon the trunnions 17. Springs 15 and 16 are connected to the vibrator 14 to support it on any suitable stationary object or frame in such a manner as to dampen vibrations therebetween.

In Figure 2, top flutes or riffles $d$ begin substantially centrally of the table 20 and extend thereacross. Each upper cutout or depressed flute $d$ and associated undercut flute $e$, is provided with two branches which, in effect, extend from the center of the table outwardly at an angle with respect to the transverse axis of the table and also with respect to each other. Such an angle may, for example, be 15 degrees, or of a value depending on the cut to be effectively taken, see my copending application Serial No. 322,325, filed March 5, 1940, and entitled Handling and dispatching materials. The collecting riffles or grooves $d$ discharge into side channel portions 26 also of porous material.

As seen particularly in Figure 2, the porous bed 20 consists of individual blocks $a$, $b$, and $c$, that are suitably secured together by cement and mounted upon frame structure 21. The feed is in the direction indicated by the arrows over the plate 21a, the table of porous blocks 20, and then over the discharge portion 22 of the frame. The blocks of side channels 26 may also be provided with flutes $d'$.

In Figure 4, I have shown a pair of rectangular-shaped upper and lower flutes $d$ and $e$. In Figure 5, I have shown a curved or semi-circular undercut flute portion $f$. In Figure 6, I have shown a top groove $g$ that has a forward face that gradually slopes in the direction of movement of the materials. In Figure 7, I have shown a somewhat larger undercut groove $e'$ and a top riffle plate $h$.

It will be apparent that the shape and size of the riffles or grooves may be controlled to vary the amount of gaseous fluid supplied through the porous block material. In the arrangement of Figure 4, it will be apparent that a greater quantity of fluid will be supplied to upper portions of the bed 20 immediately above the undercut groove $e$ and that the supply will be substantially equal along the full width of such groove. In the arrangement of Figure 5, the amount of fluid supplied will vary along the width of the groove. The same is true of the top groove $g$ of Figure 6. In the arrangement of Figure 7, I have entirely eliminated an upper groove or riffle by employing a riffle plate $h$ in combination with the undercut groove $e'$; although this will effect separation, I prefer an arrangement such as shown, for example, in Figures 4–6, inclusive, in order to provide a clear and unobstructed surface for the movement of the aggregate materials over the bed to discharge undesired materials from the end 22.

Figure 8:
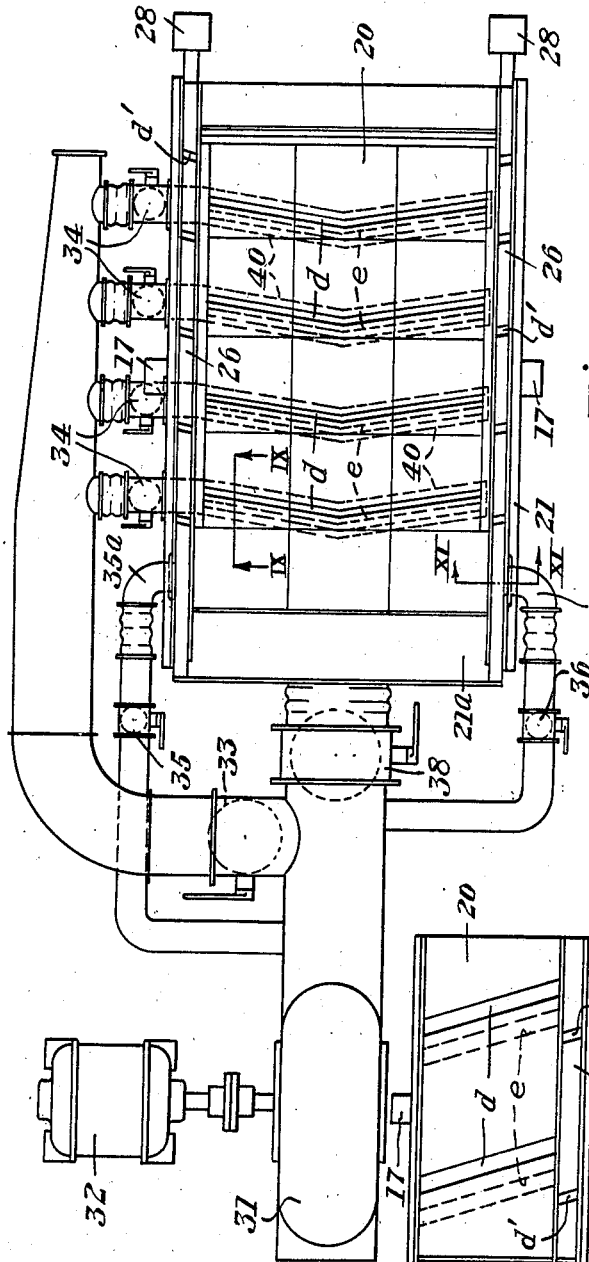
Figure 8 is a top plan view showing an arrangement for supplying fluid to a table constructed in accordance with my invention.
Figure 3:
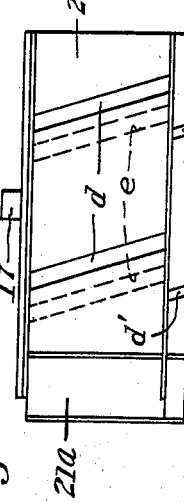
Figure 3 is a reduced top plan view similar to that of Figure 2, but showing a different flute or riffle arrangement.

In Figure 8, I have shown a motor 32 for driving a gaseous fluid blower 31 that is provided with connections to supply fluid to the table, and to separately supply the fluid to each of the collector riffles $d$ or riffle combinations $d$ and $e$. Also, separate conduits are provided for supplying the fluid to the side channels 26 which discharge into reconcentrator cups 28. The flutes or riffles $d'$ of the side channels preferably discharge into side outlets or orifices $j$ at which the value content may be collected, see particularly Figure 2. As will be apparent from a study of Figures 2 and 8, for example, each flute or riffle $d'$ lies closely adjacent to and behind an associated main flute or riffle $d$. In this manner, material discharged from the flutes or riffles $d$ passes over a major portion of the porous surface 26 before it encounters the secondary flutes or riffles $d'$. This arrangement provides a maximum effectiveness and efficiency of separating action, particularly as applied to dust-like particles of value content.

Valves 33, 34, 35, 36, and 38 make possible an independent adjustment of the supply or quantity of fluid to each of the above-mentioned agencies and a supply to those agencies upon a suitably proportioned basis. For example, to prevent fluid entering the side channels 26 from backing up material flowing in the flutes in the main bed portion 20, I can provide a lesser quantity of air by means of the control valves 35 and 36. The arrangement also makes possible supplying a greatly increased quantity of fluid immediately adjacent the collecting portions of the table, see particularly Figures 9 and 10. Pipes 35a and 36a connect to side channel chambers.

Figure 10:
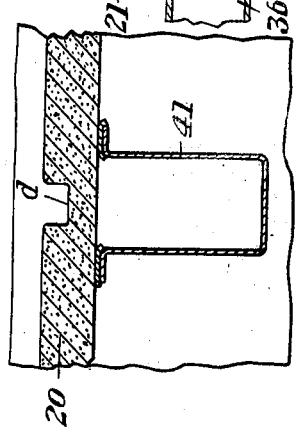
Figure 10 is a similar view showing a modified arrangement.
Figure 9:
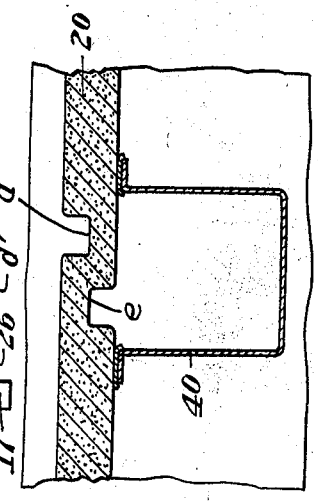
Figure 9 is a side sectional view in vertical elevation taken along the line IX—IX of Figure 8.

In Figure 9, I have shown both upper and undercut grooves, while in Figure 10 I have shown a single arrangement comprising an upper cut riffle groove $d$ for collecting the aggregate materials.

I have determined that there is an increased rate of separation immediately above the flutes or riffles $d$, $d'$ and $e$ that are preferably supplied with a greater quantity of air than other portions of the table. As will appear, the thickness of a given portion of the porous bed will, in itself, influence the quantity of air supplied. In, for example, the arrangement of Figure 10, the duct 41 can be supplied with more air than surrounding or adjacent portions of the bed; as a result, the flute $d$ will have the greatest outflow of fluid, and adjacent portions of the table within confines of duct 41 will have the next quantity, and portions of the table outside the duct will have a lesser quantity.

Although I have shown representative apparatus for the purpose of illustrating my invention, it will be apparent to those skilled in the art that many other arrangements, modifications, subtractions, and additions may be made without departing from the spirit and scope of the invention as indicated by the appended claims.

I claim:

1. In a concentrating apparatus for aggregate materials containing values, the combination with a gaseous fluid flotation bed and operating connections therefor for advancing the materials forwardly therealong, of riffles associated with the bed and arranged to collect and concentrate the values, and means adjacent said riffles for supplying a larger amount of fluid through the bed to the aggregate behind and along said riffles than through other portions of the bed.

2. In a concentrating apparatus for aggregate materials having a value content, the combination with an air flotation bed and operating connections therefor, of transversely and forwardly extending riffles associated with the bed and arranged to collect and concentrate values, and means for supplying a larger amount of air through the bed immediately behind and along said riffles than through other portions of the bed.

3. In a concentrating apparatus for aggregate materials containing values, the combination with a gaseous fluid flotation bed and vibrating connections therefor, of riffles extending transversely and forwardly of the bed, said riffles being arranged to collect and concentrate the values, means for supplying a larger amount of fluid through the bed to said riffles and through portions of the bed beyond but immediately adjacent to said riffles than through other portions of the bed.

4. In a concentrating apparatus for aggregate materials having a value content, the combination with a porous flotation table and means for forcing a gaseous fluid upwardly through the table, of transversely extending flute or riffle portions arranged to contain a greater depth of material fed than other table portions, means constructed and arranged to supply a larger amount of gaseous fluid through the table at the flute or riffle portions, and means adjacent to and along said flute or riffle portions for also supplying a larger amount of fluid through the table adjacently behind and along said riffle portions than through other portions of the bed.

5. In a concentrating apparatus for aggregate materials having a value content, the combination with a gaseous fluid flotation bed and vibrating connections therefor, of a plurality of groove riffles or flutes extending across the bed to collect the values, and grooves operably positioned in the bed beyond and along said flutes or riffles for supplying an increased quantity of gaseous fluid through the bed immediately behind said flutes or riffles.

6. In a method of concentrating values, the steps of feeding a layer of aggregate having a value content forwardly over a vibrating bed having transversely-extending flutes or riffles, supplying gaseous fluid through the bed, and supplying a greater quantity of gaseous fluid through the bed in transverse zones just behind the riffles.

7. In apparatus for concentrating the value content of aggregates, the combination with a porous bed having gaseous fluid flotation connections and means for advancing the aggregate material thereover, of means on the bed for collecting and concentrating the value content of the aggregate, and undercut portions in the bed to one side of and behind said collecting means in the direction of movement of the aggregate for providing a greater quantity of gaseous fluid adjacently behind said collecting means than through main portions of said bed.

8. In a gaseous fluid flotation bed for collecting the value content of an aggregate, grooves extending across an upper portion of the bed for collecting values, and grooves extending across the bed adjacent to said first-mentioned collector grooves and along an under portion of the bed and constructed and arranged to provide a greater fluid flotation than main portions of said bed to thereby increase the effectiveness of said collector grooves.

9. In a gaseous fluid flotation bed of porous construction, riffles or flutes extending across upper surface portions thereof for collecting the value content of an aggregate, and grooves extending along an underside of said bed adjacent to said riffles, said grooves and riffles being constructed and arranged to supply a greater quantity of gaseous fluid than adjacent portions of the bed.

10. In a bed as defined in claim 9, wherein the riffles are grooves, and at least one group of grooves is of rectangular shape.

11. In an apparatus as defined in claim 9, wherein the grooves are of curved outline.

12. In an apparatus as defined in claim 9, wherein said riffles are cut in the upper surface of said bed and have a front face that gradually slopes in the direction of movement of the aggregate over the table.

13. In a bed as defined in claim 9, separate connections to said riffles and said undercut grooves for supplying gaseous fluid thereto independently of other portions of said bed.

14. In an apparatus for concentrating the value content of an aggregate, the combination with a porous concentrating bed constructed and arranged and provided with operating connections to move the aggregate thereabove under gaseous fluid flotation, of a plurality of flutes or riffles extending across and forwardly of the bed for collecting the value content of the aggregate, a porous side channel connected to the bed and adapted to receive value content from said riffles, flutes or riffles extending transversely and forwardly along said porous side channel for reconcentrating the value content, and means for supplying a lesser quantity of air through said side channel than through main portions of said bed.

15. In a gaseous fluid flotation bed of porous construction, permeable flutes or riffles extending across upper surface portions thereof for collecting the value content of an aggregate, portions of greater porosity than the other portions of the bed extending along the bed adjacent to said riffles, and means for supplying a greater quantity of gaseous fluid through said permeable riffles and through said portions of greater porosity than to other portions of the bed.

16. In a gaseous fluid flotation bed of porous construction, permeable flutes or riffles extending across upper surface portions thereof for collecting the value content of an aggregate, portions of greater porosity than the other portions of the bed extending along an under side of the bed adjacent to said riffles, and means for supplying a greater quantity of gaseous fluid through said permeable riffles and through said portions of greater porosity than to other portions of the bed.

17. In a bed as defined in claim 9, wherein the riffles are grooves.

18. In a gaseous fluid flotation bed of porous construction, flutes or riffles extending across upper surface portions thereof for collecting the value content of an aggregate, and portions of lesser thickness extending along said bed adjacent to said riffles, said portions of lesser thickness and said riffles being constructed and arranged to supply a greater quantity of gaseous fluid than adjacent portions of the bed.

19. In an apparatus for concentrating the value content of an aggregate, the combination with a porous concentrating bed constructed and arranged and provided with operating connections to move the aggregate forwardly thereabove under gaseous fluid flotation, of a plurality of flutes or riffles extending across the bed for collecting the value content of the aggregate, each of said flutes or riffles extending continuously from a position substantially centrally of the table in the form of two branches, each of which extends forwardly of the bed, each of said flutes or riffles being spaced from and unconnected with adjacent flutes or riffles, a pair of porous side channels connected to the bed and adapted to receive value content from the branches of said riffles, and flutes or riffles extending transversely and forwardly along said porous side channels for reconcentrating the value content, each of said last-mentioned flutes or riffles being associated with one of said first-mentioned flutes or riffles and being positioned adjacently therebehind.

JAMES H. KENNEDY.